United States Patent
Chavez

(10) Patent No.: US 11,496,179 B1
(45) Date of Patent: Nov. 8, 2022

(54) TECHNIQUE FOR EFFICIENT SOFT-DECISION DEMODULATION OF HE-CPM

(71) Applicant: Rockwell Collins, Inc., Cedar Rapids, IA (US)

(72) Inventor: Carlos J. Chavez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/380,762

(22) Filed: Jul. 20, 2021

(51) Int. Cl.
| | |
|---|---|
| H04B 1/04 | (2006.01) |
| H04B 1/68 | (2006.01) |
| H04L 27/12 | (2006.01) |
| H04B 1/707 | (2011.01) |

(52) U.S. Cl.
CPC ............ H04B 1/68 (2013.01); H04B 1/04 (2013.01); H04B 1/707 (2013.01); H04L 27/122 (2013.01)

(58) Field of Classification Search
CPC . H04B 1/04; H04B 1/68; H04B 1/707; H04B 1/717; H04B 7/00; H04B 7/04; H04B 10/04; H04L 25/03; H04L 27/06; H04L 27/12; H04L 27/20; H04L 27/26; H04L 27/38; H04L 27/122; H04W 4/00
USPC ........ 370/334, 380; 375/219, 260, 262, 267, 375/308, 316, 341; 455/42, 123, 127.1, 455/456.6
See application file for complete search history.

(56) References Cited

U.S. PATENT DOCUMENTS

| | | |
|---|---|---|
| 6,438,468 B1 | 8/2002 | Muxlow et al. |
| 8,014,907 B2 | 9/2011 | Coulmeau |
| 8,849,476 B2 | 9/2014 | Coulmeau |
| 9,424,754 B2 | 8/2016 | Srivastav et al. |
| 9,697,737 B2 | 7/2017 | Hale et al. |
| 10,797,920 B1 | 10/2020 | Chavez |
| 2003/0147655 A1* | 8/2003 | Shattil .................... H04L 27/00 398/76 |
| 2018/0089247 A1 | 3/2018 | Kim et al. |
| 2020/0124441 A1 | 4/2020 | Miller et al. |
| 2020/0273356 A1 | 8/2020 | Raynaud et al. |

FOREIGN PATENT DOCUMENTS

| | | |
|---|---|---|
| CN | 110347073 A | 10/2019 |
| EP | 3118579 B1 | 1/2020 |
| EP | 3764340 A1 | 1/2021 |
| GB | 2540010 A | 1/2017 |

* cited by examiner

*Primary Examiner* — Shawkat M Ali
(74) *Attorney, Agent, or Firm* — Suiter Swantz pc llo

(57) ABSTRACT

A receiver system for demodulating a high-entropy continuous phase modulation (HE-CPM) signal is disclosed. A plurality of complex multipliers is configured to receive the synchronized HE-CPM signal. Each of the complex multipliers removes a phase associated with a respective one of a plurality of inter-symbol interference (ISI) hypotheses and generates a respective one of a plurality of complex multiplier outputs. Each ISI hypothesis includes a previous chip hypothesis corresponding to a binary value for a previous chip, and a next chip hypothesis corresponding to a binary value for a next chip. A summer is configured to combine real parts of the plurality of complex multiplier outputs to generate a soft decision for a current chip of the HE-CPM signal.

12 Claims, 3 Drawing Sheets

TECHNIQUE FOR EFFICIENT SOFT-DECISION DEMODULATION OF HE-CPM

SUMMARY

A receiver system for demodulating a high-entropy continuous phase modulation (HE-CPM) signal is disclosed in accordance with one or more illustrative embodiments of the present disclosure. In one illustrative embodiment, the system comprises a plurality of complex multipliers configured to receive the synchronized HE-CPM signal, wherein each of the complex multipliers removes a phase associated with a respective one of a plurality of inter-symbol interference (ISI) hypotheses and generates a respective one of a plurality of complex multiplier outputs, wherein each ISI hypothesis includes a previous chip hypothesis corresponding to a binary value for a previous chip, and a next chip hypothesis corresponding to a binary value for a next chip. In another illustrative embodiment, the system comprises a summer configured to combine real parts of the plurality of complex multiplier outputs to generate a soft decision for a current chip of the HE-CPM signal, wherein the soft decision is a demodulated output of the current chip of the HE-CPM signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
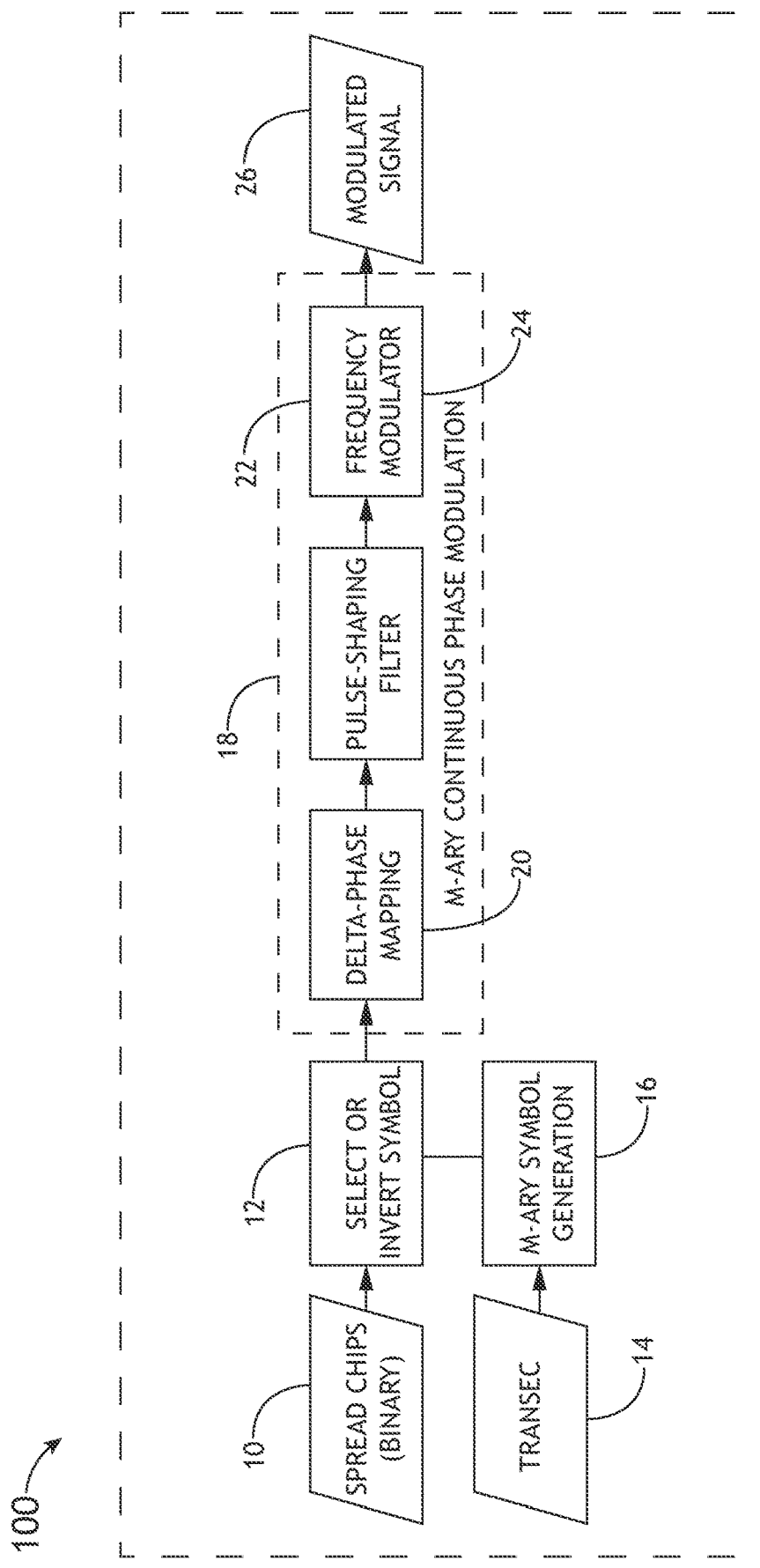
FIG. 1 is a block diagram illustrating an HE-CPM transmitter.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

High-entropy continuous phase modulation (HE-CPM) introduces intentional inter-symbol interference (ISI) into the transmitted signal in order to suppress cyclic features. HE-CPM is described in U.S. Pat. No. 10,797,920, which is incorporated by reference herein in its entirety. The suppression of cyclic features (e.g., symbol rate, carrier frequency) of the signal disrupts the ability of adversarial systems to detect, demodulate, or otherwise exploit the transmitted signal. However, an authorized receiver of the HE-CPM signal must account for the intentional ISI in order to perform successful demodulation. A conventional approach employs soft-decision trellis demodulation, preceded by a bank of matched filters. Unfortunately, the conventional approach requires extensive computational resources.

Embodiments of the present disclosure are directed to a system for efficient soft-decision demodulation of signals modulated by HE-CPM. The present system provides high demodulation performance while forgoing the bank of matched filters and the trellis demodulation associated with the conventional approach. The efficient technique of the present system reduces computation complexity for soft-decision HE-CPM demodulation by an order of magnitude relative to the conventional approach.

FIG. 1 is a block diagram illustrating an HE-CPM transmitter 100 (as described in U.S. Pat. No. 10,797,920). A spread chip 10 selects a symbol 12 from a transmission security (TRANSEC) function 14 generated pseudorandom symbol corresponding to the signal phase for one chip of an M-ary symbol generator 16. The chip 10 selects a symbol or inverts the symbol 180° based on the binary value of the chip for M-ary modulation 18. The M-ary continuous phase modulation 18 is performed first via delta-phase mapping 20, which entails a mapping of the M-ary symbol to a change in the signal phase depending on the value of the M-ary symbol. The output of the delta-phase mapper 20 is then pulse-shaping filtered 22. Each symbol is filtered by the pulse-shaping filter 22 to band-limit the communication signal and introduce intentional inter-symbol interference (ISI). The ISI further randomizes the modulated signal phase of the signal. The output of the pulse-shaping filter 22 is then modulated by the frequency modulator 24 to produce an M-ary HE-CPM signal 26 having a constant envelope, a Gaussian shaped spectrum, and the likeness of frequency-modulated Gaussian noise for transmission via a transmitter.

Figure 2:
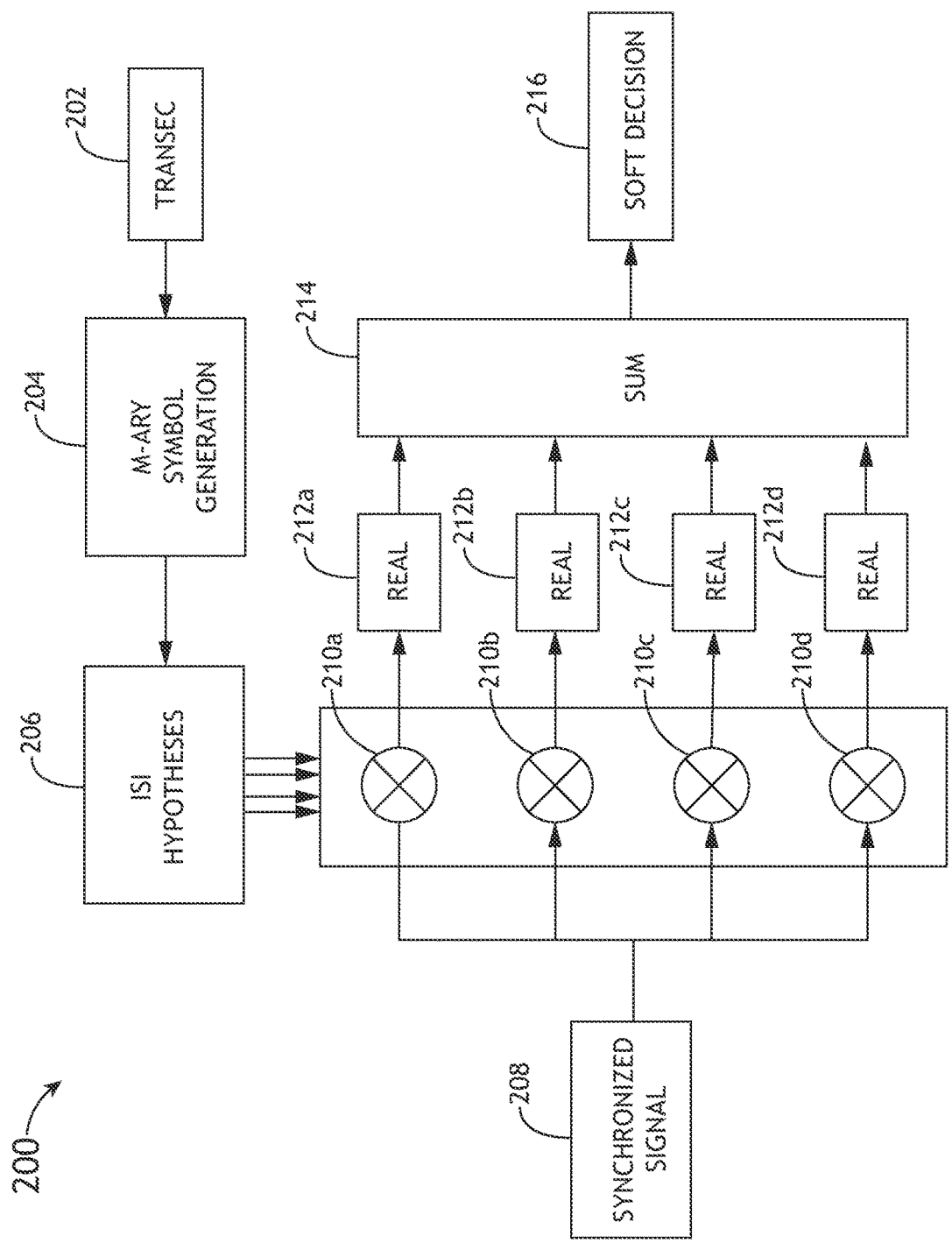
FIG. 2 is a block diagram illustrating a system for efficient soft-decision demodulation of received HE-CPM signals, in accordance with one or more embodiments of the present disclosure.

FIG. 2 is a block diagram of a system 200 for efficient soft-decision demodulation of received HE-CPM signals (e.g., the signal 26 modulated by the transmitter 100), in accordance with one or more embodiments of the present disclosure. The system 200 produces binary antipodal soft decisions by compensating for the ISI impressed upon the current chip by the previous and next chips. The system 200 generates signal phase hypotheses 206 based on known signal phases 204 generated by the TRANSEC function 202 and unknown previous and next binary chip values (e.g., 4 hypotheses). The input synchronized HE-CPM signal 208 (assumed to be baseband and complex-valued) has passed through a receiver matched filter, carrier recovery, and chip timing recovery. An appropriate matched filter may have a magnitude frequency response matched to the shape of the spectrum of the HE-CPM signal 208.

The synchronized HE-CPM signal 208 passes into a plurality of complex multipliers 210*a-d*. Each complex multiplier 210*a-d* removes the phase associated with a specific inter-symbol interference (ISI) hypothesis 206. Each hypothesis 206 corresponds to a hypothetical binary value for the previous chip and a hypothetical binary value for the next chip, assuming a binary value of "1" for the current chip. The four possible ISI hypotheses 206 arise from the four possible combinations of the binary-valued previous and next chips. The real parts 212*a-d* of the complex multiplier outputs correspond to soft decisions for each hypothesis 206, and are summed (e.g., using a summer function 214) to generate a soft decision 216 (e.g., demodulated output) for the current chip.

Because HE-CPM modulates the current chip by either selecting the TRANSEC-generated signal phase (for a chip value of "1") or the inverse of the TRANSEC-generated signal phase (for a chip value of "0"), HE-CPM is essentially a binary antipodal signaling scheme. Therefore, the sign of the soft decision 216 corresponds to a probable binary value of the current chip (positive for a "1" and negative for a "0"). The absolute value of the soft decision 216 corresponds to the confidence in the binary decision, where a higher absolute value represents a higher confidence.

Figure 3:
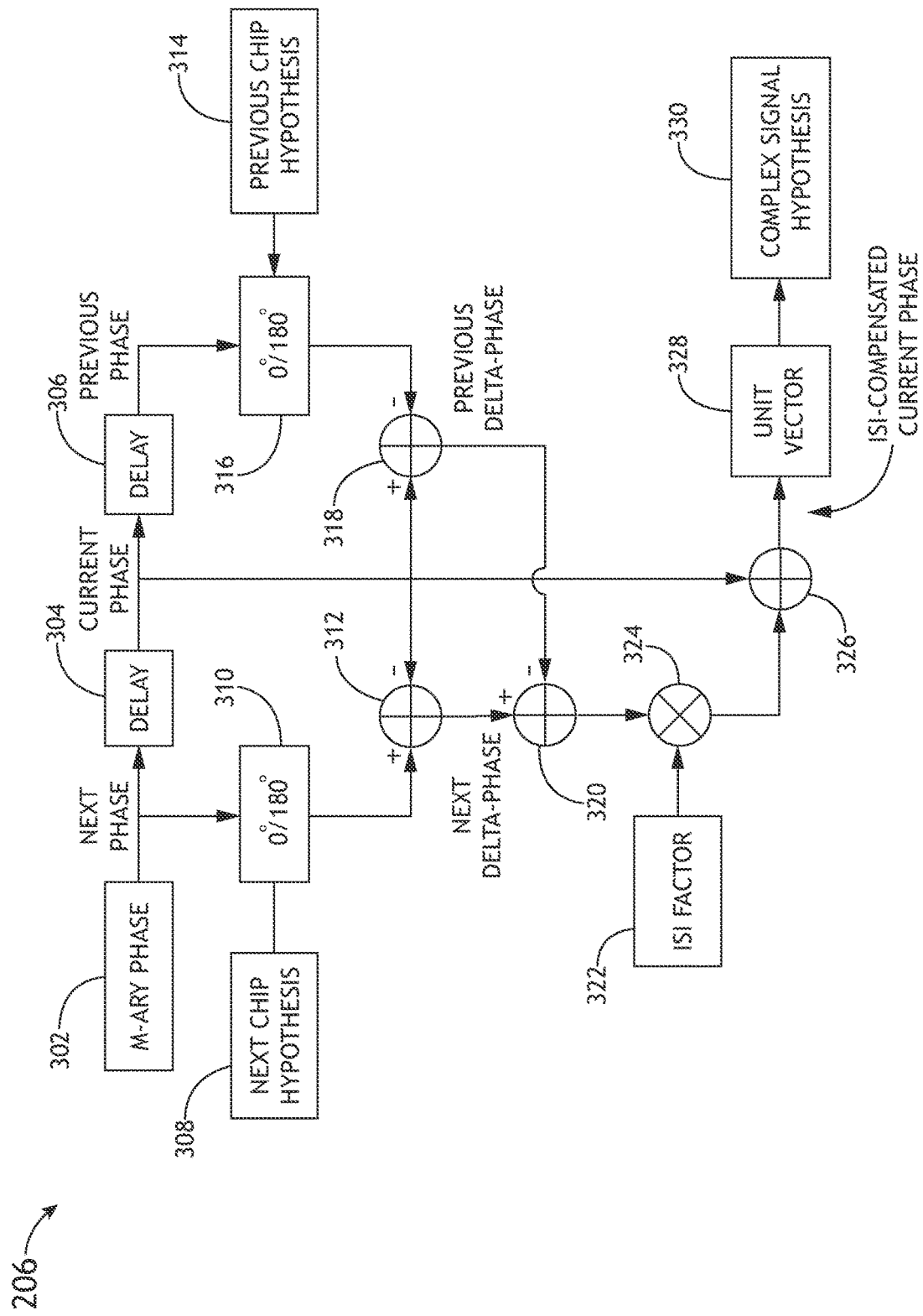
FIG. 3 is a block diagram illustrating the generation of an ISI hypotheses from M-ary signal phases, in accordance with one or more embodiments of the present disclosure.

FIG. 3 is a block diagram illustrating the generation of each of the ISI hypotheses 206 from M-ary signal phases, in accordance with one or more embodiments of the present disclosure. As with the HE-CPM transmitter 100 described with respect to FIG. 1, a TRANSEC function 202 generates M-ary pseudorandom symbols 302, where each symbol 302 corresponds to a signal phase for each chip. The M-ary phases 302 enter a delay line 304 and 306 containing the nominal phases (assuming zero ISI) for the next, current, and previous chips. All ISI hypotheses 206 assume a current chip value of "1", so the current phase passes without modification. The next and previous phases experience phase shifts 310 and 316 of 0° or 180° (corresponding to "1" or "0" values for next and previous chips), depending on the next chip hypothesis 308 and the previous chip hypothesis 314. It is noted that the four ISI hypotheses 206 arise from the four possible combinations of the binary-valued previous and next chips.

A next delta-phase 312 is computed from the current chip to the next chip, and a previous delta-phase 318 is computed from the previous chip to the current chip. The previous delta-phase 318 is subtracted from the next delta-phase 312 to generate a delta-phase output. This delta-phase output 320 is scaled 324 by an ISI factor 322 and summed 326 with the nominal current phase to form an ISI-compensated current phase. The ISI factor may be a design parameter that depends on the characteristics of the pulse shaping filter (e.g., at the transmitter 100). The complex signal hypothesis 330 may be a unit vector 328 constructed with the ISI-compensated phase. Four such unit vectors 328 are computed, one for each of the four ISI hypotheses 206. The complex multipliers 210*a-d* described with respect to FIG. 2 use the complex conjugates of these vectors 328 to remove the phases associated with each ISI hypothesis 206. It is noted that the operations described with respect to FIG. 3 wrap phase into the interval from 180° to −180° degrees.

The present system 200 for efficient HE-CPM soft-decision demodulation described herein obviates the need for a bank of matched filters as well as a demodulation trellis. The number of matched filters required by the conventional approach discussed previously increases linearly with the order M of the TRANSEC-generated symbols. Likewise, the number of states in the demodulation trellis of the conventional approach increases linearly with M. In contrast, the present system 200 does not materially increase in complexity as a function of M. Therefore, for values of M greater than 10, the efficient soft-decision technique for HE-CPM of the present system 200 easily reduces computational complexity by an order of magnitude relative to the conventional approach. Simulations indicate that the efficient technique of the present system 200 performs within tenths of a decibel of the conventional soft-decision approach for signal-to-noise ratios well below 0 dB.

As described above, the present system 200 makes use of the nominal TRANSEC-generated phases of the previous, current, and next chips to compensate for ISI. However, the present system 200 can be generalized to any number of chips preceding and succeeding the current chip. Doing so may improve performance, but may also increase computational complexity as the number of ISI hypotheses increases. Four hypotheses are required for 1 previous chip and 1 next chip, 16 hypotheses are required for 2 preceding chips and 2 succeeding chips, and so on.

Note that while the present system 200 specifically addresses soft-decision demodulation of HE-CPM signals, it has broader applicability. A more conventional CPM system may incorporate TRANSEC aspects like that of HE-CPM without suppression of cyclic features. Such a conventional system may also introduce ISI (for spectral containment reasons, for instance) and benefit similarly to the present system 200.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A receiver system for demodulating a high-entropy continuous phase modulation (HE-CPM) signal, the receiver system comprising:
a plurality of complex multipliers configured to receive the synchronized HE-CPM signal,
wherein each of the complex multipliers removes a phase associated with a respective one of a plurality of inter-symbol interference (ISI) hypotheses and generates a respective one of a plurality of complex multiplier outputs, and
wherein each ISI hypothesis includes a previous chip hypothesis corresponding to a binary value for a previous chip, and a next chip hypothesis corresponding to a binary value for a next chip; and
a summer configured to combine real parts of the plurality of complex multiplier outputs to generate a soft decision for a current chip of the HE-CPM signal, wherein the soft decision is a demodulated output of the current chip of the HE-CPM signal.

2. The receiver system of claim 1, wherein the receiver system is configured to generate each respective ISI hypothesis using a receiver-side transmitter-side transmission security (TRANSEC) function to generate M-ary pseudorandom symbols, wherein the M-ary pseudorandom symbols comprise a previous signal phase for the previous chip, a current signal phase for the current chip, and a next signal phase for the next chip.

3. The receiver system of claim 2, wherein the receiver system is configured to pass the previous signal phase, the current signal phase, and the next signal phase into a delay line.

4. The receiver system of claim 3, wherein the receiver system is configured to phase-shift the next signal phase and the previous signal phase 0° or 180° based on the next chip hypothesis and the previous chip hypothesis.

5. The receiver system of claim 4, wherein the receiver system is configured to:
generate a next delta-phase from the current signal phase to the next signal phase; and
generate a previous delta-phase from the previous signal phase to the current signal phase.

6. The receiver system of claim 5, wherein the receiver system is configured to generate a delta-phase output by subtracting the previous delta-phase from the next delta-phase.

7. The receiver system of claim 6, wherein the receiver system is configured to scale the delta-phase output by an ISI factor and sum the delta-phase output with the current signal phase to generate an ISI-compensated current phase.

8. The receiver system of claim 7, wherein the receiver system is configured to generate a respective one of a plurality of unit vectors, wherein each unit vector represents the respective ISI hypothesis using the respective ISI-compensated current phase.

9. The receiver system of claim 8, wherein the plurality of unit vectors comprise four unit vectors.

10. The receiver system of claim 8, wherein each of the plurality of complex multipliers uses a complex conjugate of the respective unit vector to remove the phase associated with respective ISI hypothesis.

11. The receiver system of claim 1, wherein the HE-CPM signal is generated by a transmitter system comprising:
a transmitter-side transmission security (TRANSEC) function configured to generate a pseudorandom symbol by M-ary symbol generation;
a spread spectrum chip configured to select a symbol with a signal phase, the selected symbol corresponding to the generated pseudorandom symbol or a phase rotation of the pseudorandom symbol; and
an M-ary continuous phase modulator, the M-ary continuous phase modulator comprising:
a delta-phase mapper configured to map the signal phase based on the selected symbol;
a pulse-shaping filter configured to band limit the spectrum of the mapped signal phase, the pulse-shaping filter configured to introduce ISI from one or more previous symbols and one or more subsequent symbols into a current symbol, the ISI introduced by a main lobe of the signal phase being contained within a bandwidth of a chip rate of the spread spectrum chip; and
a frequency modulator to modulate the frequency of the signal phase for transmitting information, thereby generating the HE-CPM signal.

12. The receiver system of claim 11, wherein the one or more previous symbols comprise a plurality of previous symbols, and the one or more subsequent symbols comprises a plurality of subsequent symbols.

* * * * *